Dec. 10, 1946.  W. H. EICHELMAN  2,412,211
DRILLER
Filed April 29, 1944
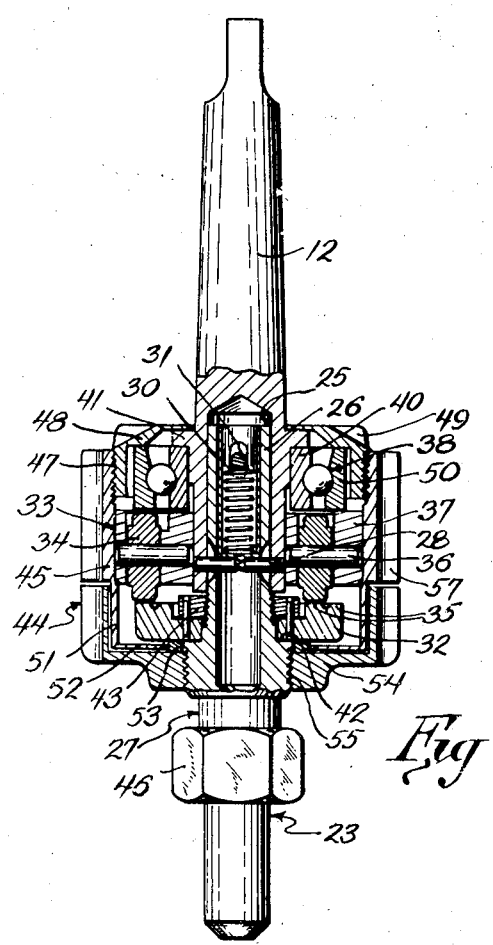
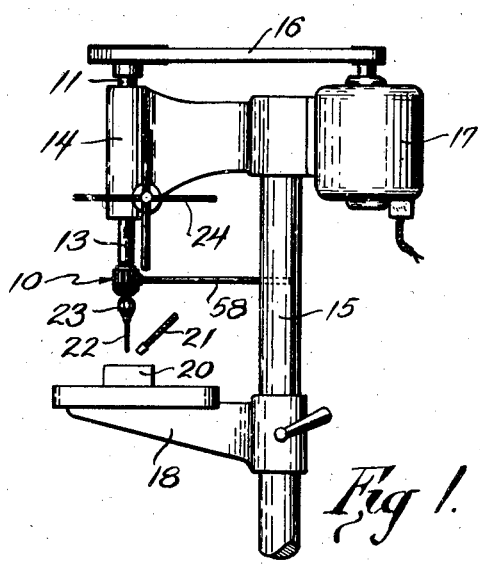
Fig 1.
Fig 2.
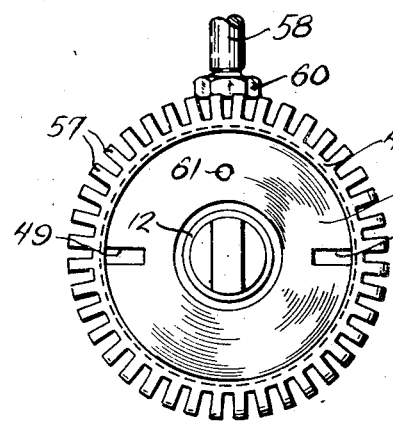
Fig 3.
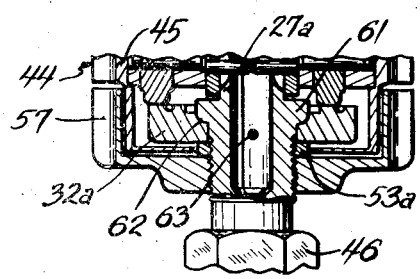
Fig 4.
INVENTOR.
William H. Eichelman
BY
HIS ATTORNEY Patented Dec. 10, 1946

2,412,211

UNITED STATES PATENT OFFICE 2,412,211

DRILLER

William H. Eichelman, Berwyn, Ill., assignor, by mesne assignments, to Ex-Cell-O Corporation, Detroit, Mich., a corporation of Michigan Application April 29, 1944, Serial No. 533,332

9 Claims. (Cl. 74—22)

The present invention relates to tools and more particularly to devices developing a rapid reciprocation of a cutter by a lubricated mechanism enclosed in a housing, such as a driller for ductile material as that shown in the application of John W. Karweit, Serial No. 484,612.

One of the objects of the present invention is to provide an improved means for dissipating the heat generated in a closed housing by the rapidly moving or oscillating parts which operate a tool under feed pressures over long periods of time.

A further object of the invention is to provide an improved manner for mounting the lowermost member of a cam and follower assembly for ready removal and replacement.

The invention is also characterized by an improved means for the rapid interchange of cams of different characteristics in a driller such as that disclosed in the above identified application; and, an improved manner for supporting the cam member in operative position under feed pressures.

A further object of the invention is to provide a self cooling driller of the class described which is simple in construction, inexpensive to manufacture and maintain and readily adaptable for particular applications.

These being among the objects of the invention, other and further objects will become apparent from the drawing, the description relating thereto and the appended claims.

Fig. 1 is a side view of the upper portion of a drill press upon which the device embodying the invention is mounted.

Fig. 2 is an enlarged vertical section taken through the device mounted upon the drill press as shown in Fig. 1.

Fig. 3 is a top view of the device shown in Fig. 2, and,

Fig. 4 is a partial section similar to Fig. 2 showing a modification of the invention.

Many of the results accomplished by the invention are derived by the simple arrangement of rotating a substantial portion of an otherwise normally stationary housing on a device which is prone to heat under long periods of operation whereby turbulence of air thus induced causes a cooling of the device without need for fans or blowers which might cause injury to workers, and establishing oil seals which prevent escape of lubricant from the housing.

Referring now to the drawing, the driller unit embodying the invention is shown at 10 where it is mounted upon a spindle 11 by means of male and female Morse tapers 12 and 13, respectively, with the spindle 11 journalled in a head 14 upon one side of a drill press standard 15 as driven through a belt 16 by a motor 17 secured to the head upon the other side of the standard. A work table 18 is also mounted upon the standard to support a work piece 20 where it can be flooded by cooling lubricant from a lubricant nozzle 21 and drilled by a twist drill 22 mounted in the chuck 23 upon the lower end of the driller. The drill 22 is fed into the work piece 20 by traversing the spindle 11 through a suitable quill (not shown) in which drive and driven spindle shafts are telescoped, the quill being traversed by a rack on the quill and a gear in mesh therewith and driven by the hand wheel 24. Upon long runs it is preferable to replace the hand feed with hydraulic or air feed.

As more particularly discussed in the Karweit application, Serial No. 484,612, reference to which is hereby made, the driller 10, during its operation, produces at the cutting edges of the drill 22 chips which are of a regulated substantially uniform size and shape for a given drill size, regardless of the material being drilled, and the size of the chips is so regulated as to be small enough to clear the drill flutes easily, yet large enough and curled sufficiently that chips will not pack in the flutes.

This is accomplished by the driller by periodically interrupting the feed pressure on the drill enough momentarily to allow the cutting edges to sever from the work, the chips being formed, and then quickly returning the drill into cutting position to make other chips to be severed like the first ones. The movement amounts to a reciprocation of momentary duration. In the process the cutting edges are lifted slightly from contact with the material at the bottom of the hole to cut the chips free from the work repeatedly at predetermined intervals, which intervals occur preferably in stepped relationship with the rotation of the drill.

In the embodiment illustrated, the reciprocation occurs once each revolution of the drill, the male member 12 having a cylindrical hole 25 in its lower end which receives reciprocably therein in telescoping relationship the upper end 26 of a drill supporting member 27 provided with the chuck 23 that is constructed in a manner similar to the chuck shown in the Benjamin Patent No. 2,228,685. The drill supporting member 27 is keyed for rotation with the male member 12 by a pin 28 which supports also a compression spring 30 disposed inside the drill supporting member between the pin 28 and a pin 31 carried only by the drill supporting member. The compression spring 30 exerts its energy upwardly against the pin 31 to move the drill supporting member 27 to the upper limit of movement permitted to it.

This upper limit is determined by a double track cam 32 carried upon the drill supporting member 27 and a follower assembly 33 made up of follower rollers 34 tracking independently in the two cam tracks 35 as journalled on shafts 36 secured in a cage 37. The cage 37 is mounted upon the male member 12 below an end thrust ball bearing 38 whose inner race 40 rests against and below a flange 41 on the male member 12.

The cam 32 rests on a shoulder 42 on the drill supporting member as pinned to and held in place by a self tightening nut 43 threaded in a counterclockwise direction on the drill supporting member 27. The follower rollers are located diametrically opposite to each other at different radial distances from the axis of rotation and the cam tracks 35 are each provided with a single dip (not shown) at diametrically opposite points. Thus the cam cooperates with the followers to provide an oscillation between the members 12 and 27 once each relative revolution of the cam 32 and the follower assembly 33.

The reciprocation accomplished will be a small fraction of an inch, preferably within the range of .005 to .030 of an inch, and may recur as often as five thousand times a minute depending upon the speed of the drill press. The action thus performed generates a great deal of heat in the moving parts and these parts must be lubricated and sealed from outside air to prevent contamination.

For the purposes of cooling and protecting the driller, a three part housing 44 is provided, the intermediate part 45 of which slips in place over the follower cage 33 when the chuck nut 46 is removed. The upper end of the intermediate part is threaded as at 47 to receive an externally threaded upper part 48 which telescopes over the outer race 50 of the bearing 38 and holds the intermediate portion 45 in place. The upper part 48 is kerfed as at 49 to receive a spanner wrench for tightening. The lower end of the intermediate part is provided with a thin wall 51 of reduced outer diameter that terminates in a radial flange 52 extending inwardly to border and cooperate in a close running fit with a washer 53. This washer is held in place by the lower part 54 of the housing which is threaded to the drill supporting member 27 as at 55. The lower part 54 otherwise closely follows the outer surface of the thin wall 51 and blends into the general outer contour of the intermediate member 45. The washer 53 is thick enough to provide adequate clearances between the overlapping section of the housing parts to permit oscillation of the lower part 54 without interference with the intermediate part 45.

The outer wall of the housing is preferably grooved along vertical lines to provide fins 57 which increase the heat dissipating area thereof and the follower cage 37 and intermediate part 45 are held against rotation by an outrigger 58 threaded into them and resting at its outer end against the standard 15 (Fig. 1). The outrigger is locked in place by a lock nut 60 (Fig. 2). Lubrication is supplied to the working parts through the oil hole 61 (Fig. 3).

In operation, the running fit between the flange 52 and the outer face of the washer 53 serves as a running seal preventing the escape of lubricant. The outer surface of the lower part 54 of the housing agitates the air sufficiently to induce circulation over the fins 57. In fact, sufficient air is agitated in most instances by movement of the lower part 54 to provide adequate cooling even though the outer surface thereof is smooth. However, fins are preferred and can easily be formed in the housing wall when the housing parts are formed as they are by casting.

The material of which the housing 44 is made is aluminum, preferably anodized black to improve heat dissipation and its appearance.

Referring to Fig. 4, an improved arrangement is shown for the ready interchange of cams having different depths for different tool set ups. A flange 61 is provided upon the drill supporting member 27a with the lower outer marginal edge thereof rounded as at 62. The cam 32a is assembled thereagainst from the bottom. The portion of the cam 32a which engages the flange 61 is concavely rounded to mate with the edge 62 and provide a limited universal, self-centering relationship. Sufficient clearance between the drill supporting member 27a and the cam 32a is provided for the cam to drop out of place when free to do so.

In Fig. 4 the washer 53 of Fig. 2 is replaced with a nut 53a having a cylindrical outer contour and slotted upon the bottom face thereof for removal by a spanner wrench. The lower portion of the housing cooperates with the nut 53a to provide a double nut locking relation to hold the parts tightly together against loosening under vibration.

With this construction, the cam can be removed merely by removing the housing 44 and the nut 53a. The cam drops away freely to be replaced with another cam. The cams in this embodiment are held against rotation by a pin and slot arrangement, the pin being shown at 63 and the slots cooperating with the ends of the pin 63 being arranged diametrically opposite each other in a plane vertical to the section shown in Fig. 4.

Having thus described certain embodiments of the invention, it will be readily apparent to those skilled in the art that various and further changes can be made without departing from the spirit of the invention, the scope of which is conmmensurate with the appended claims, and that the driller is cooled in an improved manner which is safe and efficient, the outer surface of the lower housing part having no projection, or spaces wide enough to catch and injure operators.

What is claimed is:

1. In a device of the class described, having a plurality of relatively rotating members reciprocating at a rapid rate during operation, a housing enclosing the members, a part of the housing being supported upon a stationary one of the members, and another part of the housing being mounted for rotation upon a rotating one of the members, said parts overlapping each other throughout a portion of their structure and the rotating part of the housing being exteriorly exposed to air flow from all directions for agitating the air around the stationary part of the housing and means for sealing the stationary part with respect to the rotating member to prevent escape of lubricant from the housing during operation.

2. A device of the class described including a rotating member and a stationary member whose interaction generates heat, a lubricant housing enclosing the members and comprising a plurality of parts, one of said parts being carried by the stationary member and the other part being carried by the rotating member, said parts having a line of severance between their outer surfaces in a plane perpendicular to the axis of rotation and spaced from their outer ends, both parts being exteriorly exposed to ambient air.

3. In a device of the class described, a plurality of members rotating with respect to each other and generating heat, a lubricant housing for said members having a line of severance in a plane transverse to the axis of rotation at a point intermediate the ends, said line of severance dividing the housing into a part mounted on one of the members, and another part exposed to manual contact mounted on another member to rotate and agitate and move air over the outer surface of the first mentioned part.

4. A driller having axially aligned telescoping shafts, means for reciprocating the shafts with respect to each other including a cam and follower assembly comprising a cam member and a follower member, one of said members being journalled on one of the shafts and the other of said members being carried and rotated by the other of the shafts, a housing for the members and telescoping portion of the shafts having a part secured to the journalled member, and a part holding the rotating member in place and rotating therewith.

5. In a driller of the class described having a stationary follower cage with a roller follower therein, a shaft rotatably mounted with respect to the cage and having a flange with a shoulder facing away from the cage, said shoulder having a rounded outer edge, a cam having a concave edge mating with the rounded edge and cooperating with said roller follower, means for securing the cam against said shoulder including a part portion of a housing for said cam.

6. In a driller of the class described having a stationary follower cage with a roller follower therein, a shaft rotatably mounted with respect to the cage and having a flange with a shoulder facing away from the cage, said shoulder having a rounded outer edge, a cam having a concave edge mating with the rounded edge and cooperating with said roller follower, a plural part housing, means for securing the cam against said shoulder including a part of the housing enclosing said cam, means for spacing said part of the housing from the cam, and means including another part of said housing for establishing a running seal with said spacing means.

7. In a device of the class described, having a plurality of relatively rotating members reciprocating at a rapid rate during operation, a housing enclosing the members and having longitudinally disposed fins thereon, a part of the housing being supported upon one of the members including an element holding them stationary, and another part of the housing being secured for rotation with a rotating one of the members, said parts overlapping each other throughout a portion of their structure and the rotating part of the housing agitating the air around the stationary part of the housing, and a running seal means holding the lubricant in the housing during operation.

8. A driller having axially aligned telescoping shafts, means for reciprocating the shafts with respect to each other including a cam and follower assembly comprising a follower member journalled on one of the shafts and a cam member carried on and rotated by the other of the shafts, a housing for the members and telescoping portion of the shafts, said housing having a part secured to the follower member, and providing a running seal with one of the shafts, and a part holding the cam member in place and rotating therewith.

9. In a machine tool having a plurality of cooperating and relatively rotating members whose interaction generates heat, a lubricating housing means enclosing said members over the zone of their heat generating cooperation and comprising two elements, one of said elements being supported with respect to one of the members and the other element being supported with respect to the other member and having an exterior surface exposed to manual contact in the open air, said elements having a line of severance in a plane transverse to the axis of said relative rotation of the members, and said exterior surface having a contour adapted to agitate and move air over the outer surface of said one of said elements without the danger of injuring the operator upon manual contact therewith.

WILLIAM H. EICHELMAN.